(12) United States Patent
Park et al.

(10) Patent No.: US 8,737,498 B2
(45) Date of Patent: May 27, 2014

(54) SECONDARY TRANSMITTER INCLUDED IN COGNITIVE RADIO COMMUNICATION SYSTEM AND COMMUNICATION METHOD OF THE SECONDARY TRANSMITTER

(75) Inventors: Jae Hyun Park, Busan (KR); Byung Jang Jeong, Daejeon (KR); Sung Hyun Hwang, Daejeon (KR); Jung Sun Um, Daejeon (KR); Hoi Yoon Jung, Daejeon (KR); Jin Suk Pak, Daegu (KR); Sun Min Lim, Daejeon (KR); Sang Won Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 5 days.

(21) Appl. No.: 13/464,090

(22) Filed: May 4, 2012

(65) Prior Publication Data

US 2012/0288021 A1 Nov. 15, 2012

(30) Foreign Application Priority Data

May 9, 2011 (KR) ........................ 10-2011-0043471

(51) Int. Cl.
*H04K 1/10* (2006.01)
*H04W 4/00* (2009.01)
*H04B 7/00* (2006.01)

(52) U.S. Cl.
USPC ............................ 375/260; 370/334; 455/512

(58) Field of Classification Search
USPC .......................................... 375/260; 370/334
See application file for complete search history.

(56) References Cited

U.S. PATENT DOCUMENTS

| | | | | |
|---|---|---|---|---|
| 2004/0095907 | A1* | 5/2004 | Agee et al. | 370/334 |
| 2006/0270352 | A1* | 11/2006 | Webster et al. | 455/63.4 |
| 2006/0281494 | A1* | 12/2006 | Wilson et al. | 455/562.1 |
| 2007/0287385 | A1* | 12/2007 | Stephenne | 455/67.11 |
| 2008/0080631 | A1* | 4/2008 | Forenza et al. | 375/260 |
| 2008/0153502 | A1* | 6/2008 | Park et al. | 455/446 |
| 2008/0166974 | A1* | 7/2008 | Teo et al. | 455/67.11 |
| 2008/0258981 | A1* | 10/2008 | Achour et al. | 343/702 |
| 2009/0207735 | A1* | 8/2009 | Ben Letaief et al. | 370/237 |
| 2009/0239565 | A1* | 9/2009 | Han et al. | 455/512 |

FOREIGN PATENT DOCUMENTS

| | | | |
|---|---|---|---|
| KR | 1020090109052 A | 10/2009 | |
| KR | 1020090128304 A | 12/2009 | |

* cited by examiner

*Primary Examiner* — Leon-Viet Nguyen
*Assistant Examiner* — Sarah Hassan
(74) *Attorney, Agent, or Firm* — William Park & Associates Patent Ltd.

(57) ABSTRACT

Provided is a communication method of a secondary transmitter included in a multiple-antenna based multiple input multiple output (MIMO) cognitive radio communication system, the method including: estimating an interference channel between the secondary transmitter and a primary user in each of at least one first spectrum band that is being used in a primary system; calculating an orthogonal projection matrix to cancel interference with respect to the primary user from the interference channel; calculating an effective channel between the secondary transmitter and a secondary receiver based on the to orthogonal projection matrix; and selecting an index of an optimal spectrum band from the at least one first spectrum band based on the orthogonal projection matrix and the effective channel.

18 Claims, 15 Drawing Sheets

1000

1100

SECONDARY TRANSMITTER INCLUDED IN COGNITIVE RADIO COMMUNICATION SYSTEM AND COMMUNICATION METHOD OF THE SECONDARY TRANSMITTER

CROSS-REFERENCE TO RELATED APPLICATION

This application claims the priority benefit of Korean Patent Application No. 10-2011-0043471, filed on May 9, 2011, in the Korean Intellectual Property Office, the disclosure of which is incorporated herein by reference.

BACKGROUND

1. Field of the Invention

Embodiments of the present invention relate to a communication method of a secondary transmitter, for example, a cognitive radio base station, in a multiple-antenna based multiple input multiple output (MIMO) cognitive radio communication system and a beamforming-based MIMO cognitive communication system using a linear array antenna.

2. Description of the Related Art

Currently, great attention is being paid to a cognitive radio communication system that enables a disallowed secondary user to access a spectrum band not used by an existing primary user and thereby perform communication in order to efficiently use a limited spectrum according to an increasing demand for a high speed wireless data service. Here, in the cognitive radio communication system, the secondary user should not interrupt communication of the existing primary user allowed to a predetermined spectrum band.

Accordingly, in the cognitive radio communication system, the secondary user may sense a spectrum band not used by the primary user and select a band advantageous to the secondary user from among spectrum bands not used by the primary user, thereby performing communication.

However, due to an increasing demand for spectrum bands while being closer to an inner city, it may be difficult to discover a spectrum band not being used by the primary user. Accordingly, there is a desire for a method and apparatus that may extend a width of a spectrum band selectable by a secondary user and may also increase the capacity of a cognitive radio communication system by enabling the secondary user to use a spectrum band occupied by the primary user as well as a spectrum band not used by the primary user.

SUMMARY

An aspect of the present invention provides a secondary transmitter included in a cognitive radio communication system that may protect a primary communication system and enhance a channel capacity in a multiple input multiple output (MIMO) cognitive radio communication system, and a communication method of the secondary transmitter.

Another aspect of the present invention also provides a secondary transmitter included in a cognitive radio communication system that may select an optimal spectrum band for transmitting a signal in a cognitive radio communication system, and a communication method of the secondary transmitter.

Another aspect of the present invention also provides a secondary transmitter included in a cognitive radio communication system that may protect a primary communication system and also select an optimal spectrum band in a beamforming-based MIMO cognitive radio communication system using a linear array antenna, and a communication method of the secondary transmitter.

Another aspect of the present invention also provides a secondary transmitter included in a MIMO cognitive radio communication system that may manage a backup channel with respect to a spectrum band to which a cognitive radio communication system needs to move when a primary user desires to use a spectrum band being used by the cognitive radio communication system, and a communication method of the secondary transmitter.

According to an aspect of the present invention, there is provided a communication method of a secondary transmitter included in a multiple-antenna based MIMO cognitive radio communication system, the method including: estimating an interference channel between the secondary transmitter and a primary user in each of at least one first spectrum band that is being used in a primary system; calculating an orthogonal projection matrix to cancel interference with respect to the primary user from the interference channel; calculating an effective channel between the secondary transmitter and a secondary receiver based on the orthogonal projection matrix; and selecting an index of an optimal spectrum band from the at least one first spectrum band based on the orthogonal projection matrix and the effective channel.

The selecting may include selecting the index of the optimal spectrum band from the at least one first spectrum band based on the orthogonal projection matrix and the effective channel, to maximize a channel capacity of the secondary transmitter.

The selecting may include selecting the index of the optimal spectrum band from the at least one first spectrum band to maximize a channel gain of the effective channel, and the method may further include adjusting a covariance of a transmission signal to maximize a channel capacity of the secondary transmitter in an index of the selected optimal spectrum band.

The method may further include replacing the orthogonal projection matrix with an identity matrix corresponding to the number of antennas installed in the primary user, with respect to a second spectrum band that is not being used by the primary user. The selecting may include selecting the index of the optimal spectrum band from the at least one first spectrum band based on the identity matrix and the effective channel.

The method may further include sequentially storing indices of spectrum bands in a backup channel list in an order starting from the index of the optimal spectrum band maximizing a channel gain of the effective channel.

The method may further include sensing available spectrum bands regardless of whether the primary user uses each of the at least one first spectrum band.

The method may further include: determining whether there is at least one second spectrum band not used by the primary user among the available spectrum bands; and setting, as the index of the optimal spectrum band, an index of a second spectrum band maximizing a channel gain of the effective channel from the at least one second spectrum band, when there is the at least one second spectrum band not used by the primary user.

According to another general aspect of the present invention, there is provided a communication method of a secondary transmitter included in a beamforming-based MIMO cognitive radio communication system using a linear array antenna, the method including: estimating an angle of arrival between the secondary transmitter and a primary user in each of at least one first spectrum band that is being used by a primary system; calculating an orthogonal projection matrix to cancel interference with respect to the primary user from an array response matrix based on the angle of arrival; calculating an effective channel between the secondary transmitter and a secondary receiver based on the orthogonal projection matrix; and selecting an index of an optimal spectrum band from the at least one first spectrum band based on the orthogonal projection matrix and the effective channel.

The selecting may include selecting the index of the optimal spectrum band from the at least one first spectrum band based on the orthogonal projection matrix and the effective channel, to maximize a channel capacity of the secondary transmitter.

The selecting may include selecting the index of the optimal spectrum band from the at least one first spectrum band to maximize a channel gain of the effective channel. The method may further include adjusting a covariance of a transmission signal to maximize a channel capacity of the secondary transmitter in an index of the selected optimal spectrum band.

The method may further include replacing the orthogonal projection matrix with an orthogonal projection matrix that is nulled toward the primary user, with respect to a second spectrum band that is not being used by the primary user. The selecting may include selecting the index of the optimal spectrum band from the at least one first spectrum band based on the orthogonal projection matrix that is nulled toward the primary user and the effective channel.

The method may further include sequentially storing indices of spectrum bands in a backup channel list in an order starting from the index of the optimal spectrum band maximizing a channel gain of the effective channel.

The estimating may include estimating an angle of arrival of a signal that comes from a spectrum band of the primary user into the secondary transmitter, or an angle of arrival of a signal that is transmitted via multiple paths and comes into the secondary transmitter.

The estimating may further include estimating the angle of arrival using geographical location or a phase difference between antennas, included in the linear antenna array, and an antenna gain. The phase difference and the antenna gain may be stored in a database.

The method may further include sensing available spectrum bands regardless of whether the primary user uses each of the at least one first spectrum band.

The method may further include: determining whether there is at least one second spectrum band not used by the primary user among the available spectrum bands; and setting, as the index of the optimal spectrum band, an index of a second spectrum band maximizing a channel gain of the effective channel from the at least one second spectrum band, when there is the at least one second spectrum band not used by the primary user.

According to still another aspect of the present invention, there is provided a secondary transmitter included in a multiple-antenna based MIMO cognitive radio communication system, the secondary transmitter including: an interference channel estimator to estimate an interference channel between the secondary transmitter and a primary user in each of at least one first spectrum band that is being used in a primary system; a calculator to calculate an orthogonal projection matrix to cancel interference with respect to the primary user from the interference channel, and to calculate an effective channel between the secondary transmitter and a secondary receiver based on the orthogonal projection matrix; and a selector to select an index of an optimal spectrum band from the at least one first spectrum band based on the orthogonal projection matrix and the effective channel.

According to yet another aspect of the present invention, there is provided a secondary transmitter included in a beamforming-based MIMO cognitive radio communication system using a linear array antenna, the secondary transmitter including: an angle of arrival estimator to estimate an angle of arrival between the secondary transmitter and a primary user in each of at least one first spectrum band that is being used by a primary system; a calculator to calculate an orthogonal projection matrix to cancel interference with respect to the primary user from an array response matrix based on the angle of arrival, and to calculate an effective channel between the secondary transmitter and a secondary receiver based on the orthogonal projection matrix; and a selector to select an index of an optimal spectrum band from the at least one first spectrum band based on the orthogonal projection matrix and the effective channel.

According to embodiments of the present invention, by enabling a secondary user to use a spectrum band occupied by a primary user as well as a spectrum band not used by the primary user in order to transmit a signal in a cognitive radio communication system, it is possible to extend a width of a spectrum band selectable by the secondary user and to enhance the capacity of the cognitive radio communication system.

Also, according to embodiments of the present invention, it is possible to protect a primary communication system and to select an optimal spectrum band by performing a preprocessing process.

Also, according to embodiments of the present invention, when a primary user desires to use a spectrum band being used by a cognitive radio communication system, it is possible to quickly change the spectrum band by managing a backup channel with respect to a spectrum band to which the cognitive radio communication system needs to move.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
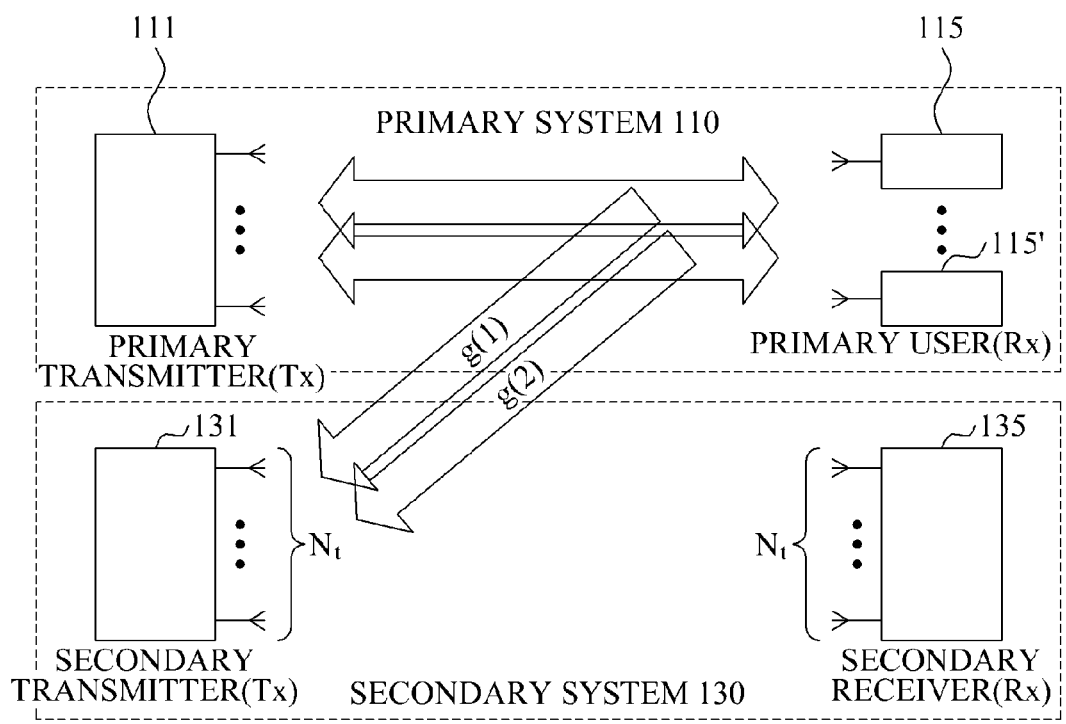
FIG. 1 is a diagram illustrating a system of a general cognitive radio network.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, an existing communication system allowed for a predetermined spectrum, for example, frequency band, is referred to as a primary system. A communication system disallowed to use a predetermined spectrum band of the primary system by a cognitive radio communication is referred to as a secondary system. Also, a terminal, for example, a receiver of the primary system is referred to as a primary user, a cognitive radio base station is referred to as a secondary transmitter, and a cognitive radio terminal is referred to as a secondary receiver or a secondary user.

Figure 2:
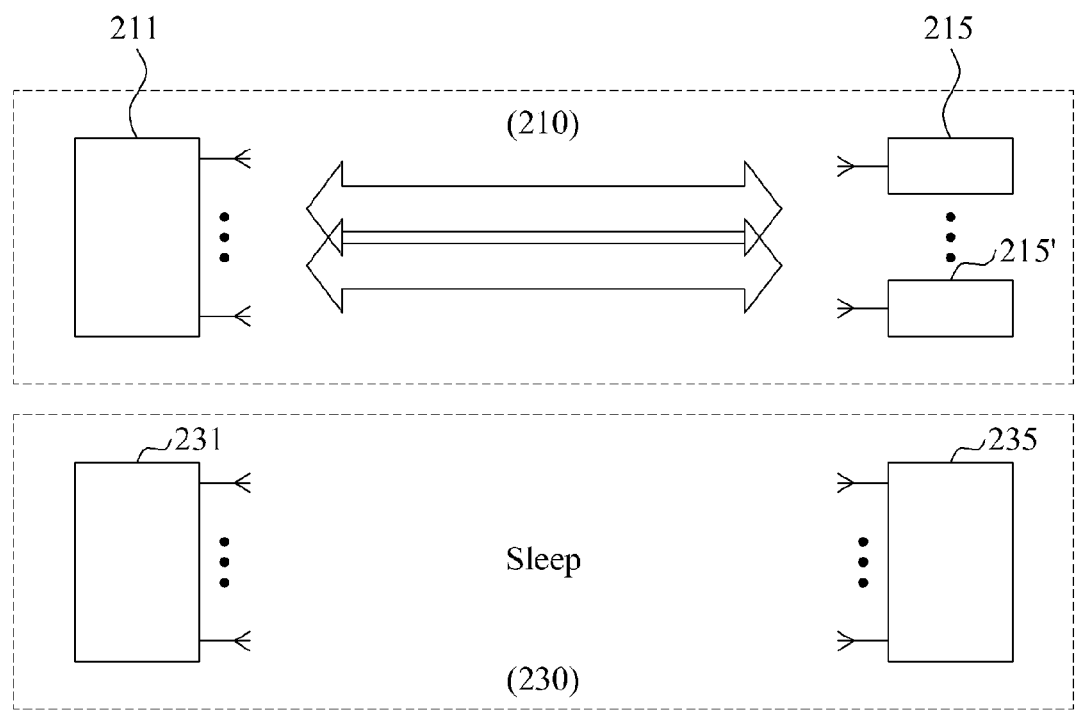
FIG. 2 is a diagram illustrating a connection method between a primary system and a secondary system when all of the spectrum bands are busy in a general cognitive radio network.

FIG. 1 is a diagram illustrating a system of a general cognitive radio network, and FIG. 2 is a diagram illustrating a connection method between a primary system and a secondary system when all of the spectrum bands are busy in a general cognitive radio network.

Referring to FIG. 1, an environment in which a plurality of primary users including primary users 115 and 115', a single secondary transmitter 131, and a single secondary receiver 135 are present may be considered. Here, each primary user includes a single antenna.

Here, it is assumed that a total of k spectrum bands are present in a primary system 110 and $M_k$ primary users are connected to the spectrum bands, respectively. Also, a probability that a $k^{th}$ spectrum band will not be used by the primary users is assumed as $P_k$. Accordingly, $P_k$ may be low in inner city areas and $P_k$ may be high in local areas. Hereinafter, for ease of description, $M_k=1$, however, $M_k>1$ may also be applicable.

It is assumed that the secondary transmitter 131 includes $$N_t \left( N_t > \max_k M_k \right)$$

antennas and the secondary receiver 135 includes $N_r$ antennas.

Also, it is assumed that a channel (hereinafter, an interference channel) from the primary user 115 to the secondary transmitter 131 in a $k^{th}$ band is $g(k) \epsilon^{N_t \times 1}$, and each of components has an independent zero-mean Gaussian probability distribution.

On the other hand, it is assumed that a channel from the secondary transmitter 131 to the secondary receiver 135 is $H(k) \epsilon^{N_r \times N_t}$, and has an independent zero-mean Gaussian probability distribution with variance of "1".

Accordingly, a signal $y(k) \epsilon^{N_r \times 1}$ received at the secondary receiver 135 through the $k^{th}$ band may be expressed by, $$y(k) = H(k)x(k) + n(k) \quad \text{[Equation 1]}$$

In Equation 1, $x(k) \epsilon^{N_t \times 1}$ denotes a signal transmitted from the secondary transmitter 131, and $n(k) \epsilon^{N_r \times 1}$ denotes a complex white Gaussian noise vector having a covariance matrix of $\sigma^2 I_{Nr}$.

In general, spectrum access technology may measure a received signal strength indicator (RSSI), that is, $\|g(k)\|_2^2$ in each spectrum band through spectrum sensing, and may detect a vacant, that is, empty spectrum band through an energy detector based on the measured RSSI.

Also, the primary user 115 may detect a vacant spectrum band using a unique characteristic of a signal exchanged with a primary transmitter 111.

Next, the secondary system 130 may select an optimal spectrum band based on channel information associated with the secondary system 130 among vacant spectrum bands of the primary user 115, and may design a transmission signal $x(k)$ of the secondary system 130 by applying a multiple input multiple output (MIMO) communication scheme to the selected optimal spectrum band.

When all of the spectrum bands of a primary system 210 are used by a primary transmitter 211 and a primary user 215, a secondary system 230, for example, a secondary transmitter 231 and a secondary receiver 235 may enter into a sleep mode and then wait until an available spectrum band is detected. In particular, the above situation may frequently occur in inner city areas, which may result in degrading the system capacity.

Figure 3:
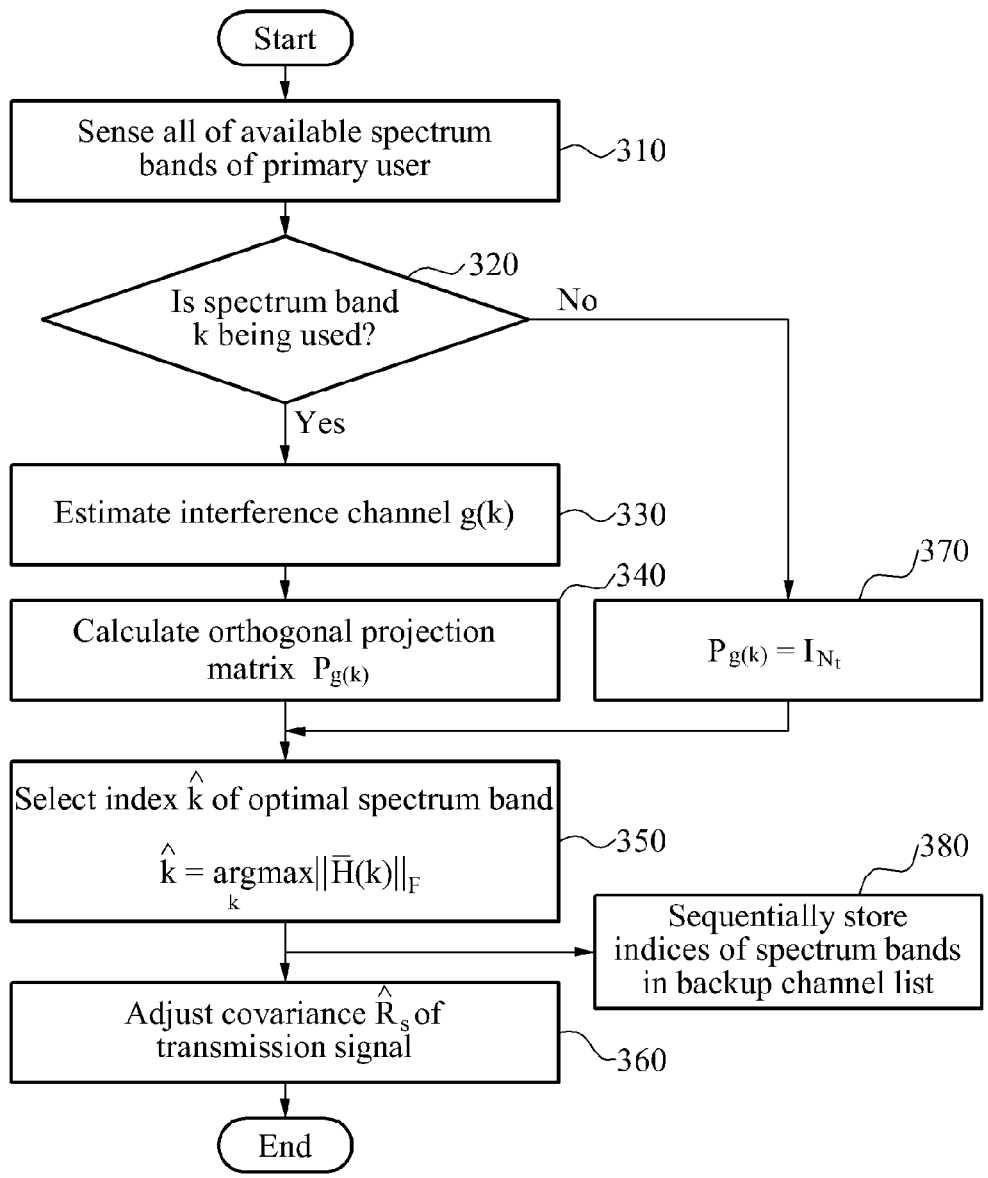
FIG. 3 is a flowchart illustrating a communication method of a secondary transmitter included in a multiple input multiple output (MIMO) cognitive radio communication system according to an embodiment of the present invention.

FIG. 3 is a flowchart illustrating a communication method of a secondary transmitter included in a MIMO cognitive radio communication system according to an embodiment of the present invention.

Hereinafter, for ease of description, a spectrum band being currently used by a primary user among spectrum bands is referred to as a first spectrum band, and a spectrum band not being currently used by the primary user, that is, a vacant spectrum band of the primary user is referred to as a second spectrum band. The first spectrum band and the second spectrum band may not be fixed at all times and may vary depending on whether a corresponding spectrum band is being used by the primary user.

In operation 310, a secondary transmitter may sense all of or a portion of available spectrum bands regardless of whether the primary user uses each of at least one spectrum band.

While sensing spectrum bands, the secondary transmitter may distinguish a spectrum band not being used by the primary user from a spectrum band being used by the primary user.

In operation 320, the secondary transmitter may determine whether the primary user is using a spectrum band.

When the primary user is using the spectrum band, the secondary transmitter may estimate an interference channel g(k) between the secondary transmitter and the primary user in each of at least one first spectrum band that is being used by a primary system, in operation 330. The secondary transmitter may estimate the interference channel g(k) by applying a blind channel estimation scheme with respect to at least one first spectrum band being used by the primary user.

In operation 340, the secondary transmitter may calculate an orthogonal projection matrix $P_{g(k)}$ to cancel interference with respect to the primary user from the interference channel g(k).

The secondary transmitter may design a transmission signal x(k) to be orthogonal to a channel $g^H(k)$, in order not to give interference to the primary user. Accordingly, the transmission signal x(k) may be given by, $$x(k) = P_{g(k)} s(k) \quad \text{[Equation 2]}$$

In Equation 2, s(k) denotes a symbol desired to be transmitted and $P_{g(k)}$ denotes the orthogonal projection matrix.

The orthogonal projection matrix $P_{g(k)}$ may be expressed by, $$P_{g(k)} = I_{N_t} - g(k)(g^H(k)g(k))^{-1} g^H(k) \quad \text{[Equation 3]}$$

In Equation 3, $g^H(k)$ denotes a conjugate transpose of g(k).

A process of nulling a transmission signal to a channel from the primary user to the secondary transmitter through Equation 2 may be referred to as a preprocessing process for cancelling interference with respect to the primary user. Also, since the transmission signal of the secondary transmitter does not interfere with the primary user through the preprocessing process, for example, since $g^H(k)x(k)=0$, the secondary transmitter may set an effective channel to $\overline{H}(k) = H(k)P_{g(k)}$ and may design s(k) suitable for the effective channel, more accurately, a covariance $R_s$ of the transmission signal, regardless of whether the primary user uses a spectrum band.

In operation 350, the secondary transmitter may calculate an effective channel $\overline{H}(k)$ between the secondary transmitter and a secondary receiver based on the orthogonal projection matrix $P_{g(k)}$, and may select an index $\hat{k}$ of the optimal spectrum band from the at least one first spectrum band based on the orthogonal projection matrix $P_{g(k)}$ and the effective channel $\overline{H}(k)$.

Accordingly, in operation 350, the secondary transmitter may select the index $\hat{k}$ of the optimal spectrum band from the at least one first spectrum band based on the orthogonal projection matrix $P_{g(k)}$ and the effective channel $\overline{H}(k)$, and may design the covariance $R_s$ of the transmission signal to be suitable for the selected band.

More specifically, the secondary transmitter may select the index $\hat{k}$ of the optimal spectrum band from the at least one first spectrum band based on the orthogonal projection matrix $P_{g(k)}$ and the effective channel $\overline{H}(k)$, to maximize a channel capacity $C(H(k), g(k), R_s)$ of the secondary transmitter, and may design the covariance $R_s$ of the transmission signal to be suitable for the selected band.

When selecting an index of an optimal spectrum band, the secondary transmitter may select the index of the optimal spectrum band from at least one spectrum band to maximize a channel gain of the effective channel. In this case, in operation 360, the secondary transmitter may adjust or design the covariance of the transmission signal to maximize the channel capacity of the secondary transmitter in the selected index of the optimal spectrum band.

In operation 360, the spectrum band index $\hat{k}$ and the covariance $R_s = E[s(k)s^H(k)]$ of the transmission signal may be jointly calculated to maximize the channel capacity according to the following Equation 4, $$(\hat{k}, \hat{R}_s) = \arg\max_{k, R_s} C(H(k), g(k), R_s) \quad \text{[Equation 4]}$$

In Equation 4, the channel capacity $C(H(k), g(k), R_s)$ may be given by, $$C(H(k), g(k), R_s) = \log \det \left( I + \frac{1}{\sigma_n^2} H(k) P_{g(k)} R_s P_{g(k)}^H H(k)^H \right)$$
$$= \log \det \left( I + \frac{1}{\sigma_n^2} \overline{H}(k) R_s \overline{H}(k)^H \right) \text{ bits/Hz} \quad \text{[Equation 5]}$$

In Equation 5, $\overline{H}(k) = H(k)P_{g(k)}$.

Accordingly, $R_s$ may be calculated by applying a water-filling scheme with respect to the effective channel $\overline{H}(k)$. The index $\hat{k}$ of the optimal spectrum band may be selected after calculating an optimized $\hat{R}_s$ with respect to each k.

However, since $R_s$ needs to be calculated with respect to all of the spectrum bands, a significant amount of calculations may be used.

Accordingly, to decrease an amount of calculations, the index $\hat{k}$ of the optimal spectrum band may be calculated using a low-complexity scheme of selecting the index to maximize a channel gain of the effective channel $\overline{H}(k)$ or a Frobenius norm of the effective channel $\overline{H}(k)$, as expressed by, $$\hat{k} = \arg\max_k \|\overline{H}(k)\|_F \quad \text{[Equation 6]}$$

When using Equation 6, $\hat{R}_s$ may be designed or adjusted to maximize a capacity of the effective channel only in the selected $\hat{k}_{th}$ band and thus, it is possible to decrease an amount of calculations used to calculate $R_s$ with respect to all of the spectrum bands.

On the contrary, when the primary user does not use a spectrum band, the spectrum band not used by the primary user may be set as $P_{g(k)} = I_{N_t}$. Here, $I_{N_t}$ denotes an $N_t \times N_t$ identity matrix.

That is, in operation 370, the secondary transmitter may replace the orthogonal projection matrix with an identity matrix corresponding to the number of antennas installed in the primary user, with respect to a spectrum band not being used by the primary user, for example, a secondary spectrum. In this case, in operation 350, the secondary transmitter may select the index of the optimal spectrum band from the at least one spectrum band based on the identity matrix and the effective channel.

When the primary user enters in a spectrum channel being used by the secondary user, the secondary transmitter may need to empty the using spectrum band and move to another band. Accordingly, to quickly move, a secondary system may use a backup channel list or a spectrum band index.

In operation 380, the secondary transmitter may store and manage indices of spectrum bands in a backup channel list in an order starting from the index of the optimal spectrum band maximizing the channel gain of the effective channel or the Frobenius norm as shown in Equation 6. That is, a priority order of a channel to which the secondary user moves due to the appearance of the primary user may be determined in a descending order of the channel gain of the effective channel. Accordingly, it is possible to quickly and efficiently change a channel.

Figure 4:
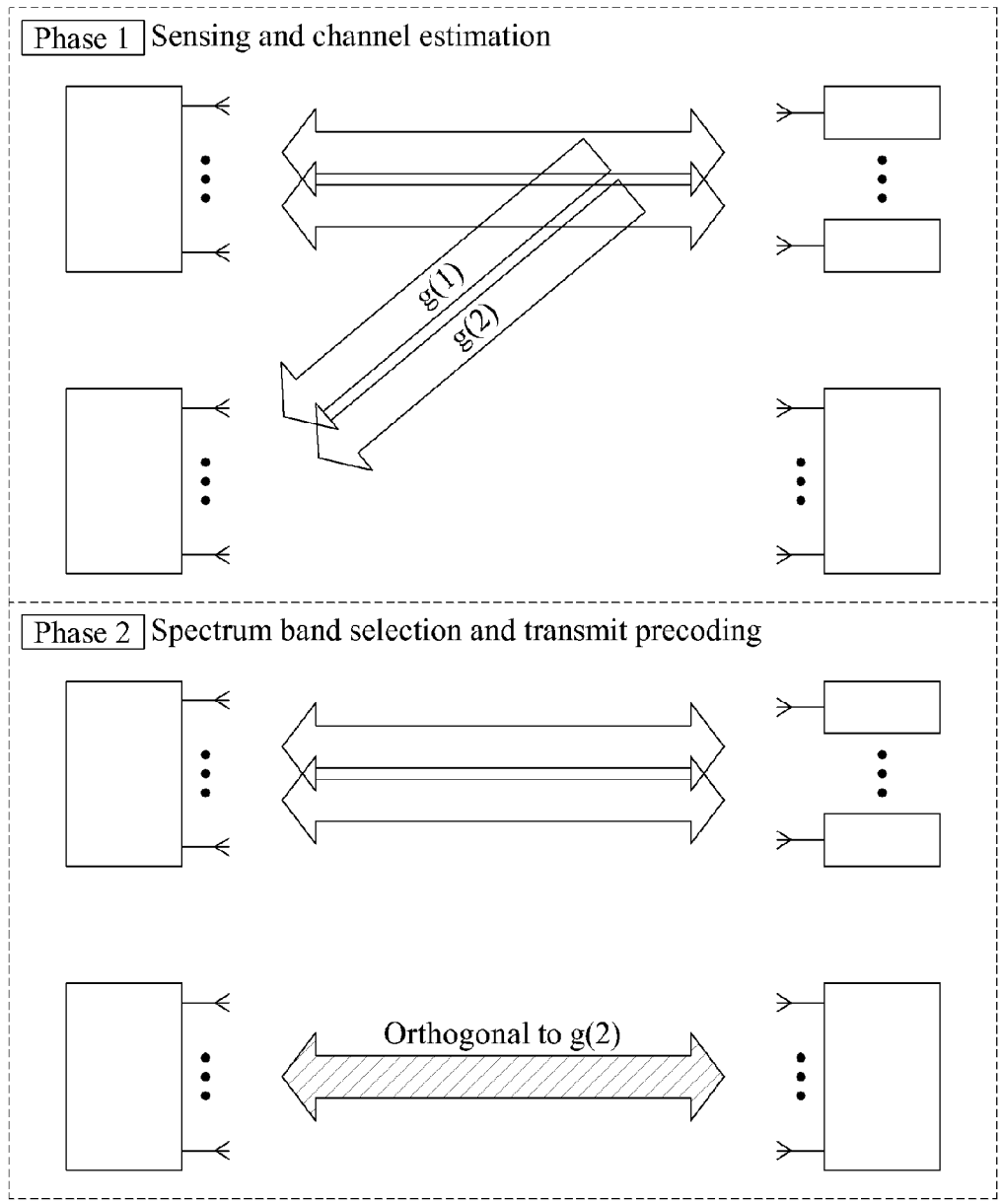
FIG. 4 is a diagram illustrating an operation of a spectrum access scheme in a MIMO cognitive radio communication system according to an embodiment of the present invention.

FIG. 4 is a diagram illustrating an operation of a spectrum access scheme in a MIMO cognitive radio communication system according to an embodiment of the present invention.

A spectrum sensing and access operation of a secondary system including multiple antennas may include two phases. In phase 1, an interference channel g(k) may be estimated together with a process of sensing an available spectrum. Here, the secondary transmitter is unaware of a transmission data frame of a primary user and thus, may estimate the interference channel g(k) using a blind scheme. In phase 2, not to give interference to the primary user, preprocessing for cancelling interference with respect to the primary user and spectrum band selection may be performed based on the estimated channel interference g(k).

As described above, spectrum access technology using MIMO antennas may use a process of estimating the interference channel g(k) from the primary user to the secondary transmitter.

However, an interference channel estimation process may not be easily configured and many errors may occur. Accordingly, a cognitive radio communication system using a linear array antenna, not using the interference channel estimation process, will be discussed.

Figure 5A:
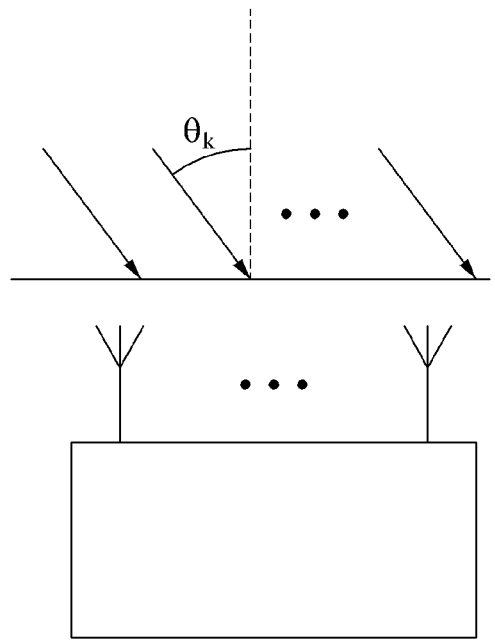
FIGS. 5A and 5B illustrate an operation of a beamforming-based cognitive radio communication system using a linear array antenna according to an embodiment of the present invention.
Figure 5B:
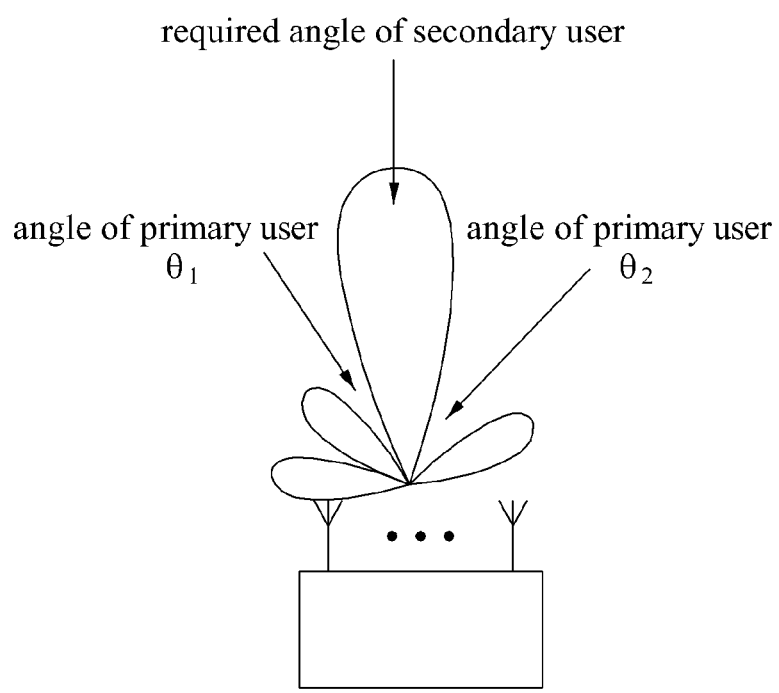

FIGS. 5A and 5B illustrate an operation of a beamforming-based cognitive radio communication system using a linear array antenna according to an embodiment of the present invention.

Even though the linear array antenna as shown in FIG. 5A is herein used, a general array antenna may also be applied.

When using the linear array antenna, an interference channel g(k) may be expressed by, $$g(k) = g_k a(\theta_k) \quad \text{[Equation 7]}$$

In Equation 7, $$a(\theta_k) = \left[1, e^{-j\frac{2\pi d \sin\theta_k}{\lambda}}, \ldots, e^{-j(N_t-1)\frac{2\pi d \sin\theta_k}{\lambda}}\right]^T$$

denotes an array response vector, $g_k$ denotes a channel gain, $\theta_k$ denotes an angle of arrival (AOA) of a primary user in a $k_{th}$ band, d denotes a distance between antennas included in an array antenna, and $\lambda$ denotes a wavelength of an antenna signal.

As shown in FIG. 5B, only with AOA $\theta_k$, it is possible to give nulling toward the primary user and thereby form a beam to prevent a signal of the secondary transmitter from interfering with the primary user. The orthogonal projection matrix $P_{\theta_k}$ giving nulling as above may be expressed by Equation 8, which is similar to Equation 3.

$$P_{\theta_k} = I_{N_t} - a(\theta_k)(a^H(\theta_k)a(\theta_k))^{-1}a^H(\theta_k) \quad \text{[Equation 8]}$$

Here, the AOA $\theta_k$ may be an AOA of a signal that is reflected by line of sight (LOS) between the primary user and the secondary transmitter and via multiple paths and thereby is received. Accordingly, even though the orthogonal projection matrix with respect to a single AOA $\theta_k$ is calculated using Equation 8, the orthogonal projection matrix with respect to a plurality of AOAs through a plurality of primary users or multiple paths may be expressed by, $$P_{\theta_k} = I_{N_t} - A_k(A_k^H A_k)^{-1} A_k^H \quad \text{[Equation 9]}$$

In Equation 9, $A_k = [a(\theta_1), \ldots, a(\theta_L)]$ denotes an array response matrix in which array response vectors $a(\theta_k)$ of corresponding AOAs are accumulated.

Unlike a process of estimating a channel in a multi-antenna based spectrum access scheme, an array antenna based spectrum access scheme may use a database storing a geographical location of the secondary transmitter or a location of the primary user to estimate the AOA $\theta_k$. An operation of the secondary transmitter included in the cognitive radio communication system using the linear array antenna will be described with reference to FIG. 6.

Figure 6:
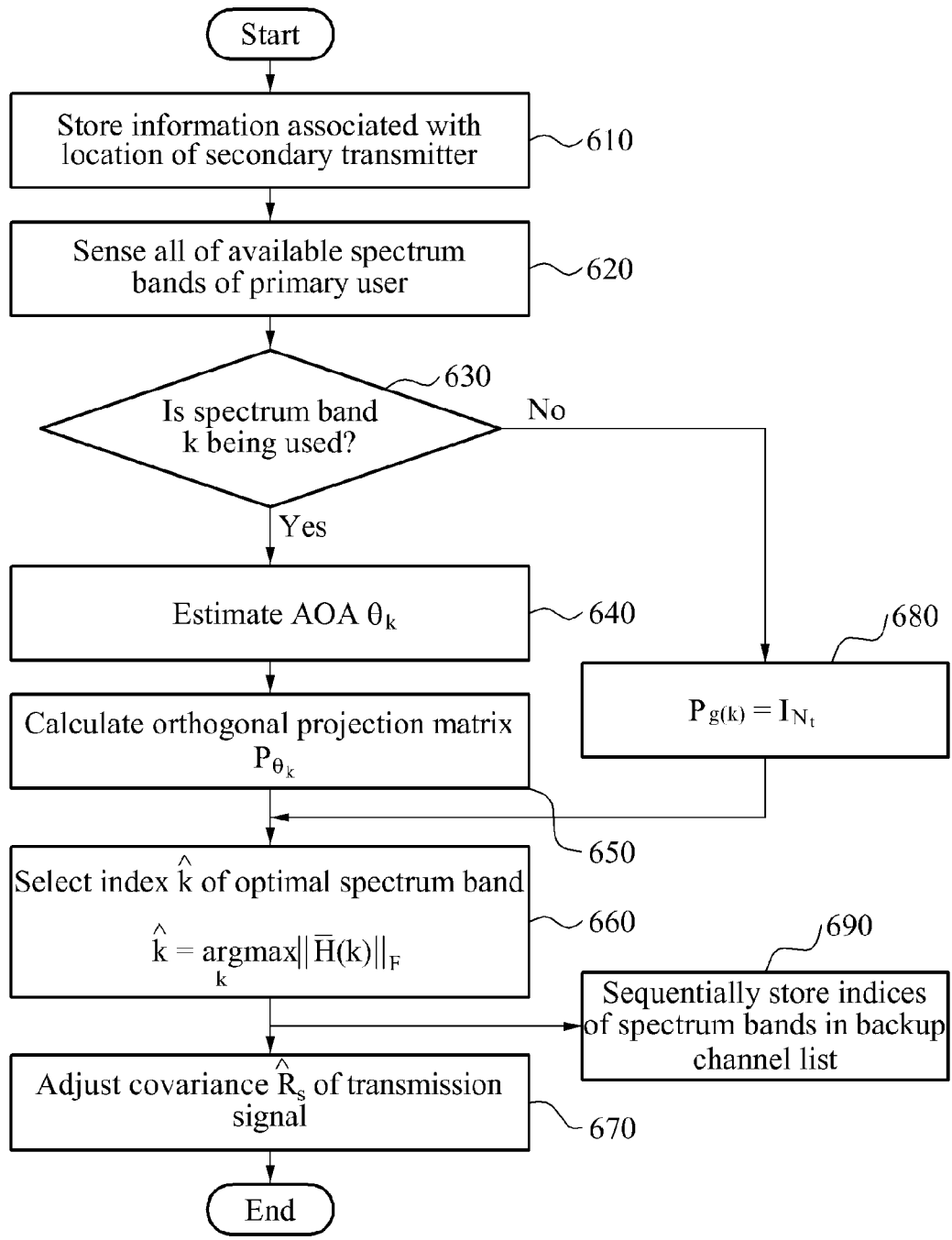
FIG. 6 is a flowchart illustrating a communication method of a secondary transmitter included in a cognitive radio communication system using a linear array antenna according to an embodiment of the present invention.

FIG. 6 is a flowchart illustrating a communication method of a secondary transmitter included in a cognitive radio communication system using a linear array antenna according to an embodiment of the present invention.

In operation 610, the secondary transmitter may store information associated with a location of the secondary transmitter. Here, information associated with the location of the secondary transmitter may include a geographical location of the secondary transmitter or an antenna gain and a phase difference between antennas included in an array antenna installed in the secondary transmitter.

In operation 620, regardless of whether a primary user uses each of at least one spectrum band, the secondary transmitter may sense all of or a portion of available spectrum bands.

While sensing spectrum bands, the secondary transmitter may distinguish a spectrum band not being used by the primary user from a spectrum band being used by the primary user.

In operation 630, the secondary transmitter may determine whether the primary user is using a spectrum band.

When the primary user is using the spectrum band in operation 630, the secondary transmitter may estimate an AOA $\theta_k$ between the secondary transmitter and the primary user in each of at least one first spectrum band being used by a primary system in operation 640.

In operation 640, the secondary transmitter may estimate an AOA of a signal that comes from a spectrum band of the primary user into the secondary transmitter or an AOA of a signal that is reflected via multiple paths and comes into the secondary transmitter.

Also, the secondary transmitter may estimate an AOA using a geographical location or an antenna gain and a phase difference between antennas included in the linear array antenna. The antenna gain and the phase difference may be stored in a database.

In operation 650, the secondary transmitter may calculate an orthogonal projection matrix $P_{\theta_k}$ for cancelling interference with respect to the primary user, from an array response matrix $a(\theta_k)$ based on the AOA $\theta_k$.

In operation 660, the secondary transmitter may calculate an effective channel $\overline{H}(k)$ between the secondary transmitter and a secondary receiver based on the orthogonal projection matrix $P_{\theta_k}$, and may select an index $\hat{k}$ of an optimal spectrum band from the at least one first spectrum band based on the orthogonal projection matrix $P_{\theta_k}$ and the effective channel $\overline{H}(k)$.

When selecting the index $\hat{k}$ of the optimal spectrum band, the secondary transmitter may select the index of the optimal spectrum band from the at least one spectrum band to maximize a channel gain of the effective channel $\overline{H}(k)$. In this case, the secondary transmitter may adjust or design a covariance $R_s=E[s(k)s^H(k)]$ of a transmission signal to maximize a channel capacity $C(H(k),g(k),R_s)$ of the secondary transmitter in the selected index of the optimal spectrum band in operation 670.

In operation 660, the secondary transmitter may select the index of the optimal spectrum band from the at least one first spectrum band based on the orthogonal projection matrix and the effective channel, and may design the covariance $R_s$ of the transmission signal suitable for the selected band.

More specifically, to maximize the channel capacity $C(H(k),g(k),R_s$ of the secondary transmitter, the secondary transmitter may select the index of the optimal spectrum band from the at least one first spectrum band based on the orthogonal projection matrix and the effective channel.

When the primary user does not use a spectrum band in operation 630, the secondary transmitter may replace the orthogonal projection matrix with an identity matrix corresponding to the number of antennas $N_t$ of the primary user with respect to a second spectrum band not being used by the primary user in operation 680. When the primary user is not using a spectrum band, there is no need to perform nulling toward the primary user. On the contrary, when the primary user is using a spectrum band, the orthogonal projection matrix may be replaced with an orthogonal projection matrix that is nulled toward the primary user.

In the case of operation 680, the secondary transmitter may select the index of the optimal spectrum band from the at least one first spectrum band based on the effective channel and the identity matrix corresponding to the number of antennas $N_t$ of the primary user.

In operation 690, the secondary transmitter may sequentially store indices of spectrum bands in a back channel list in an order starting from the index of the optimal spectrum band maximizing a channel gain of the effective channel selected in operation 660.

Figure 7:
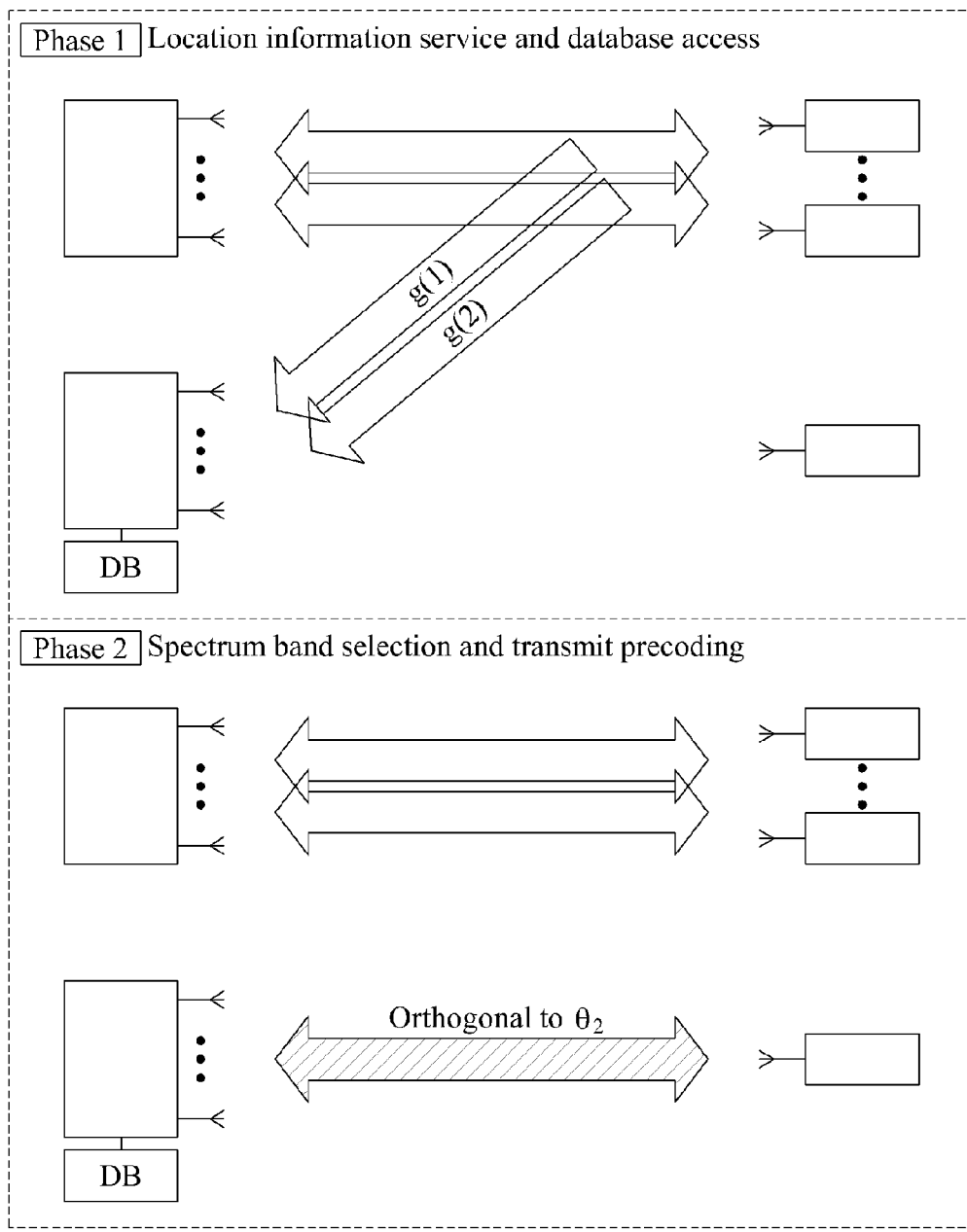
FIG. 7 is a diagram illustrating an operation of a spectrum access scheme using a linear array antenna according to an embodiment of the present invention.

FIG. 7 is a diagram illustrating an operation of a spectrum access scheme using a linear array antenna according to an embodiment of the present invention.

FIG. 7 shows an operation of a beamforming-based spectrum access scheme using a linear array antenna. In phase 1, a secondary transmitter may estimate information associated with an AOA $\theta_k$ using a geographical location and a database access. Next, in phase 2, the secondary transmitter may perform preprocessing using Equation 8 or Equation 9 or spectrum band selection.

In the aforementioned embodiments of FIG. 3 and FIG. 6, an optimal spectrum band may be selected based on a channel gain of an effective channel with respect to all of available spectrum bands regardless of whether the primary user is using a spectrum band. In addition to the aforementioned embodiments, when second spectrum bands not used by a primary user are present, the secondary transmitter may select an optimal second spectrum band or a second spectrum band having a largest channel gain from among the vacant second spectrum bands. Only when there is no vacant second spectrum band, the secondary transmitter may select a first spectrum band maximizing a channel gain of the effective channel and may access the selected first spectrum band.

That is, since there is no vacant spectrum band, the secondary transmitter may initially operate in a first spectrum band maximizing the channel gain of the effective channel. When a vacant second spectrum band appears, the secondary transmitter may move to the vacant second spectrum band. The above communication method will be further described with reference to FIG. 8 and FIG. 9.

Figure 8:
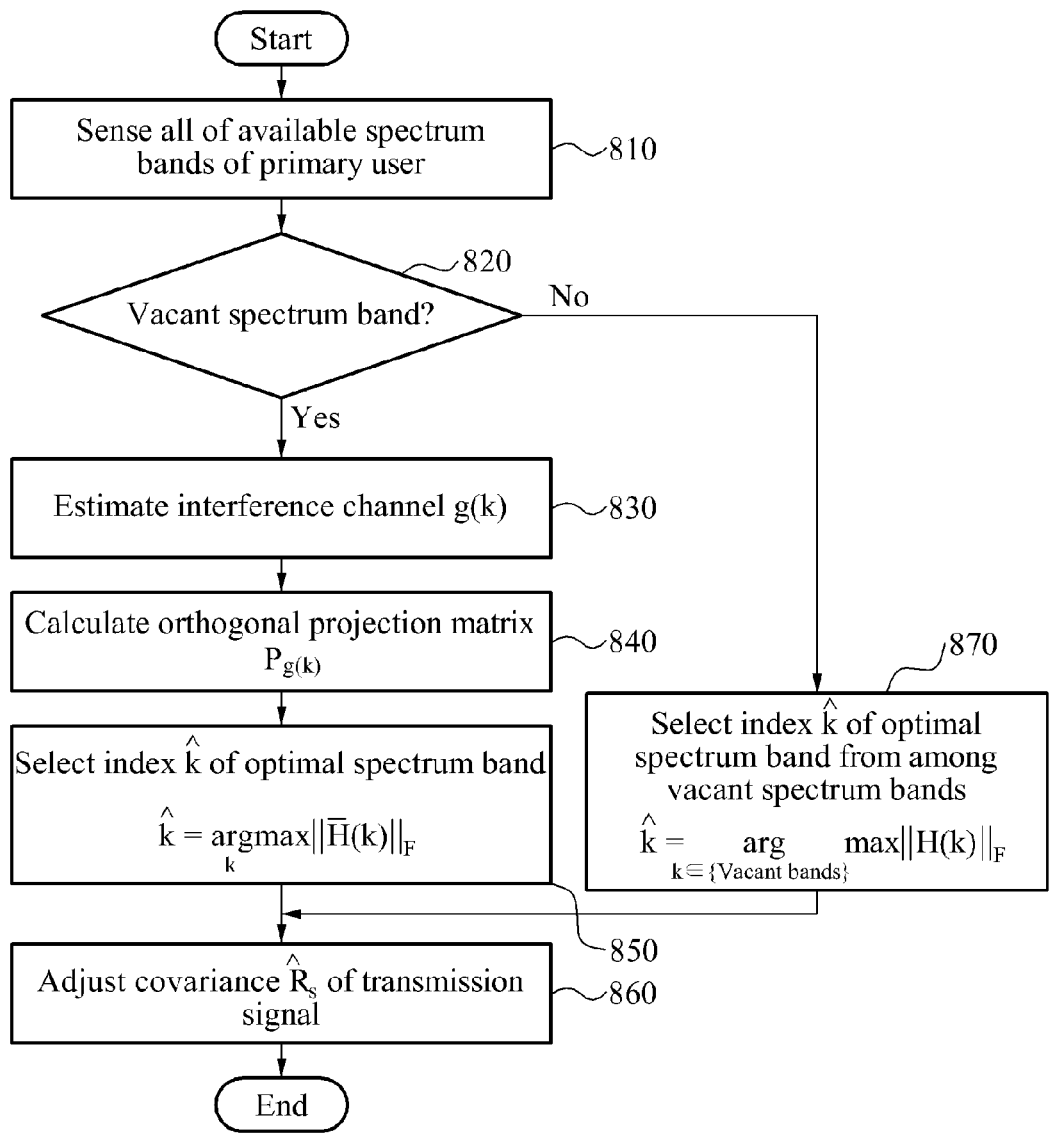
FIG. 8 is a flowchart illustrating a communication method of a secondary transmitter included in a MIMO cognitive radio communication system according to another embodiment of the present invention.

FIG. 8 is a flowchart illustrating a communication method of a secondary transmitter included in a MIMO cognitive radio communication system according to another embodiment of the present invention.

In operation 810, the secondary transmitter may sense available spectrum bands regardless of whether a primary user uses each of at least one spectrum band.

In operation 820, the secondary transmitter may determine whether there is at least one second spectrum band not being currently used by the primary user among the available spectrum bands.

When there is no second spectrum band not being currently used by the primary user in operation 820, the secondary transmitter may estimate an interference channel between the secondary transmitter and the primary user in each of at least one first spectrum band being currently used by the primary system.

In operation 840, the secondary transmitter may calculate an orthogonal projection matrix for cancelling interference with respect to the primary user from the interference channel.

In operation 850, the secondary transmitter may calculate an effective channel between the secondary transmitter and a secondary receiver based on the orthogonal projection matrix, and may select an index of an optimal spectrum band from the at least one first spectrum band based on the orthogonal projection matrix and the effective channel.

When selecting the index of the optimal spectrum band, the secondary transmitter may select the index of the optimal spectrum band from the at least one first spectrum band to maximize a channel gain of the effective channel. In this case, the secondary transmitter may adjust or design a covariance of a transmission signal to maximize a channel capacity of the secondary transmitter in the selected index of the optimal spectrum band in operation 860.

In operation 850, the secondary transmitter may select the index of the optimal spectrum band from the at least one first spectrum band based on the orthogonal projection matrix and the effective channel.

More specifically, the secondary transmitter may select the index of the optimal spectrum band from the at least one first spectrum band based on the orthogonal projection matrix and the effective channel, to maximize the channel capacity of the secondary transmitter.

When there is at least one second spectrum band not used by the primary user, the secondary transmitter may set, as the index of the optimal spectrum band, an index of a second spectrum band maximizing the channel gain of the effective channel in the at least one second spectrum band not being used by the primary user in operation 870. Here, in operation 860, the secondary transmitter may adjust or design the covariance of the transmission signal to maximize the channel capacity of the secondary transmitter in the index of the second spectrum band maximizing the channel gain of the effective channel.

Figure 9:
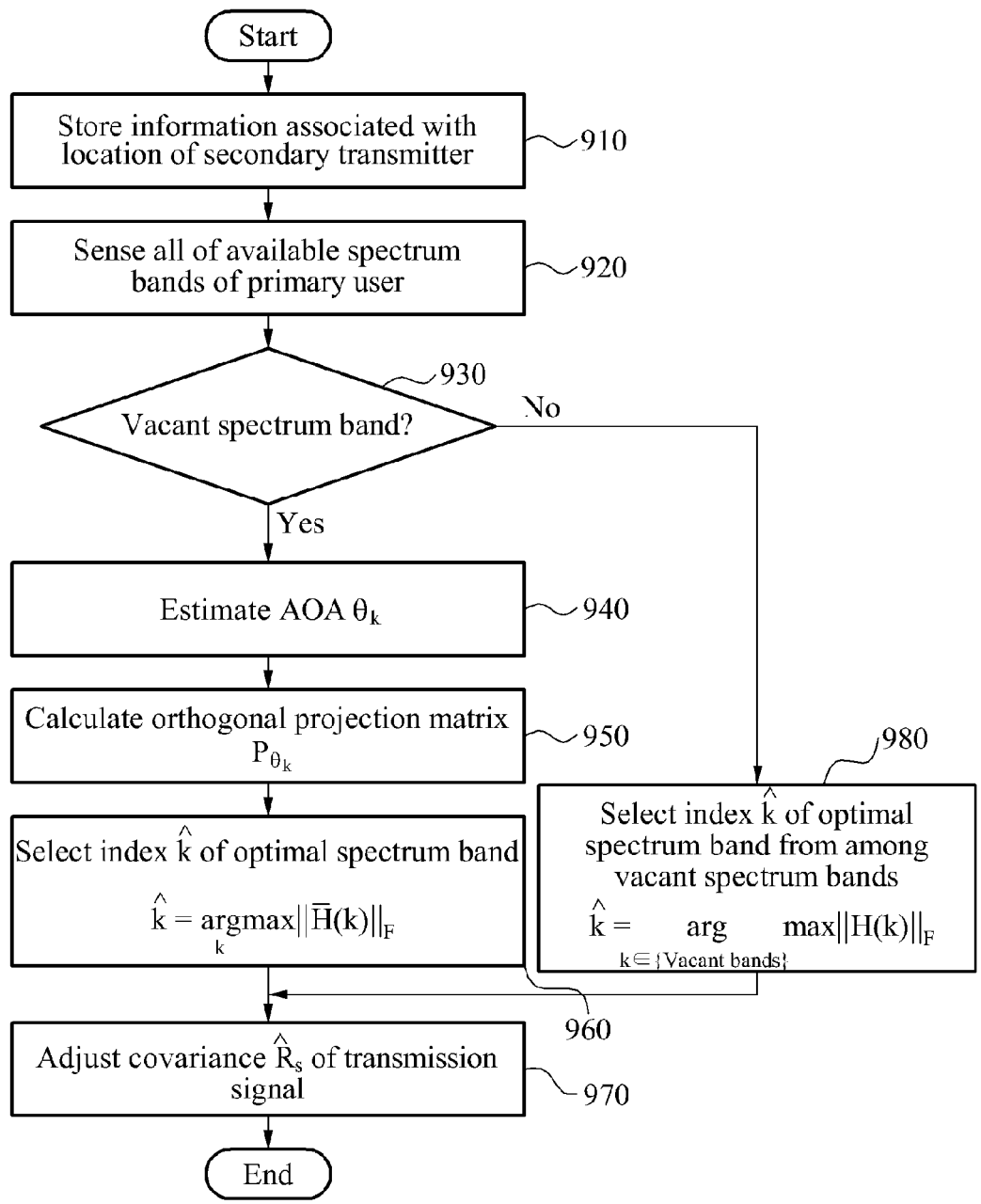
FIG. 9 is a flowchart illustrating a communication method of a secondary transmitter included in a cognitive radio communication system using a linear array antenna according to another embodiment of the present invention.

FIG. 9 is a flowchart illustrating a communication method of a secondary transmitter included in a cognitive radio communication system using a linear array antenna according to another embodiment of the present invention.

In operation 910, the secondary transmitter may store information associated with a location of the secondary transmitter. Here, information associated with the location of the secondary transmitter may include a geographical location of the secondary transmitter or an antenna gain and a phase difference between antennas included in an antenna array installed in the secondary transmitter.

In operation 920, regardless of whether a primary user uses each of at least one spectrum band, the secondary transmitter may sense available spectrum bands.

In operation 930, the secondary transmitter may determine whether there is at least one second spectrum band not used by the primary user among the available spectrum bands.

When there is no second spectrum band not being used by the primary user in operation 930, the secondary transmitter may estimate an AOA between the secondary transmitter and the primary user in each of at least one first spectrum band being currently used by a primary system in operation 940.

In operation 950, the secondary transmitter may calculate an orthogonal projection matrix for cancelling interference with respect to the primary user, from an array response matrix based on the AOA.

In operation 960, the secondary transmitter may calculate an effective channel between the secondary transmitter and a secondary receiver based on the orthogonal projection matrix, and may select an index of an optimal spectrum band from the at least one first spectrum band based on the orthogonal projection matrix and the effective channel.

When selecting the index of the optimal spectrum band, the secondary transmitter may select the index of the optimal spectrum band from the at least one first spectrum band to maximize a channel gain of the effective channel. In this case, the secondary transmitter may adjust or design a covariance of a transmission signal to maximize a channel capacity of the secondary transmitter based on the orthogonal projection matrix and the effective channel in operation 970.

In operation 960, the secondary transmitter may select the index of the optimal spectrum band from the at least one first spectrum band based on the orthogonal projection matrix and the effective channel.

More specifically, the secondary transmitter may select the index of the optimal spectrum band from the at least one first spectrum band based on the orthogonal projection matrix and the effective channel, to maximize the channel capacity of the secondary transmitter.

When there is at least one second spectrum band not used by the primary user, the secondary transmitter may set, as the index of the optimal spectrum band, an index of the second spectrum band maximizing the channel gain of the effective channel in the at least one second spectrum band in operation 980.

In this case, the secondary transmitter may adjust or design the covariance of the transmission signal to maximize the channel capacity of the secondary transmitter in the index of the secondary spectrum band maximizing the channel gain of the effective channel in operation 970.

Figure 10:
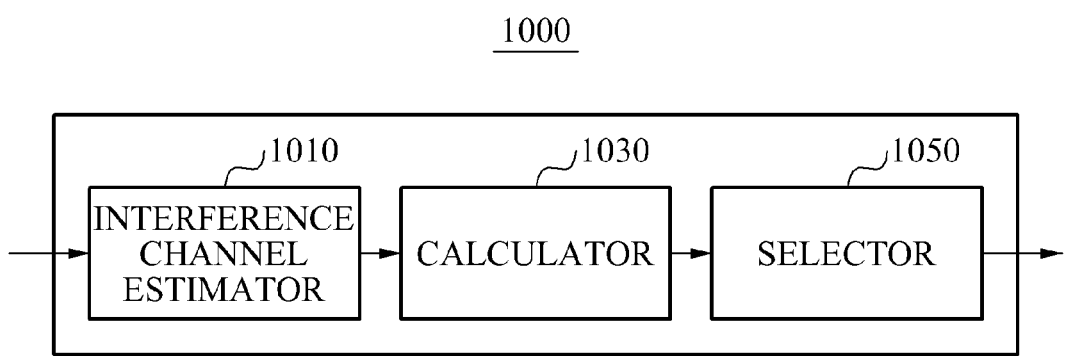
FIG. 10 is a block diagram illustrating a secondary transmitter included in a MIMO cognitive radio communication system according to an embodiment of the present invention.

FIG. 10 is a block diagram illustrating a secondary transmitter 1000 included in a MIMO cognitive radio communication system according to an embodiment of the present invention.

Referring to FIG. 10, the secondary transmitter 1000 may include an interference channel estimator 1010, a calculator 1030, and a selector 1050.

The interference channel estimator 1010 may estimate an interference channel between the secondary transmitter and a primary user in each of at least one first spectrum band that is being used in a primary system.

The calculator 1030 may calculate an orthogonal projection matrix to cancel interference with respect to the primary user from the interference channel, and may calculate an effective channel between the secondary transmitter and a secondary receiver based on the orthogonal projection matrix.

The selector 1050 may select an index of an optimal spectrum band from the at least one first spectrum band based on the orthogonal projection matrix and the effective channel.

Figure 11:
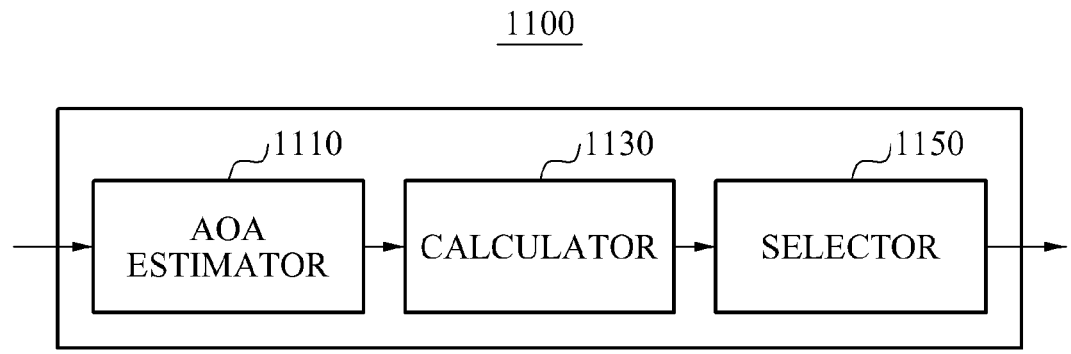
FIG. 11 is a block diagram illustrating a secondary transmitter included in a cognitive radio communication system using a linear array antenna according to another embodiment of the present invention.

FIG. 11 is a block diagram illustrating a secondary transmitter 1100 included in a cognitive radio communication system using a linear array antenna according to another embodiment of the present invention.

Referring to FIG. 11, the secondary transmitter 1100 may include an AOA estimator 1110, a calculator 1130, and a selector 1150.

The AOA estimator 1110 may estimate an AOA between the secondary transmitter and a primary user in each of at least one first spectrum band that is being used by a primary system.

The calculator 1130 may calculate an orthogonal projection matrix to cancel interference with respect to the primary user from an array response matrix based on the AOA, and may calculate an effective channel between the secondary transmitter and a secondary receiver based on the orthogonal projection matrix.

The selector 1150 may select an index of an optimal spectrum band from the at least one first spectrum band based on the orthogonal projection matrix and the effective channel.

Figure 12:
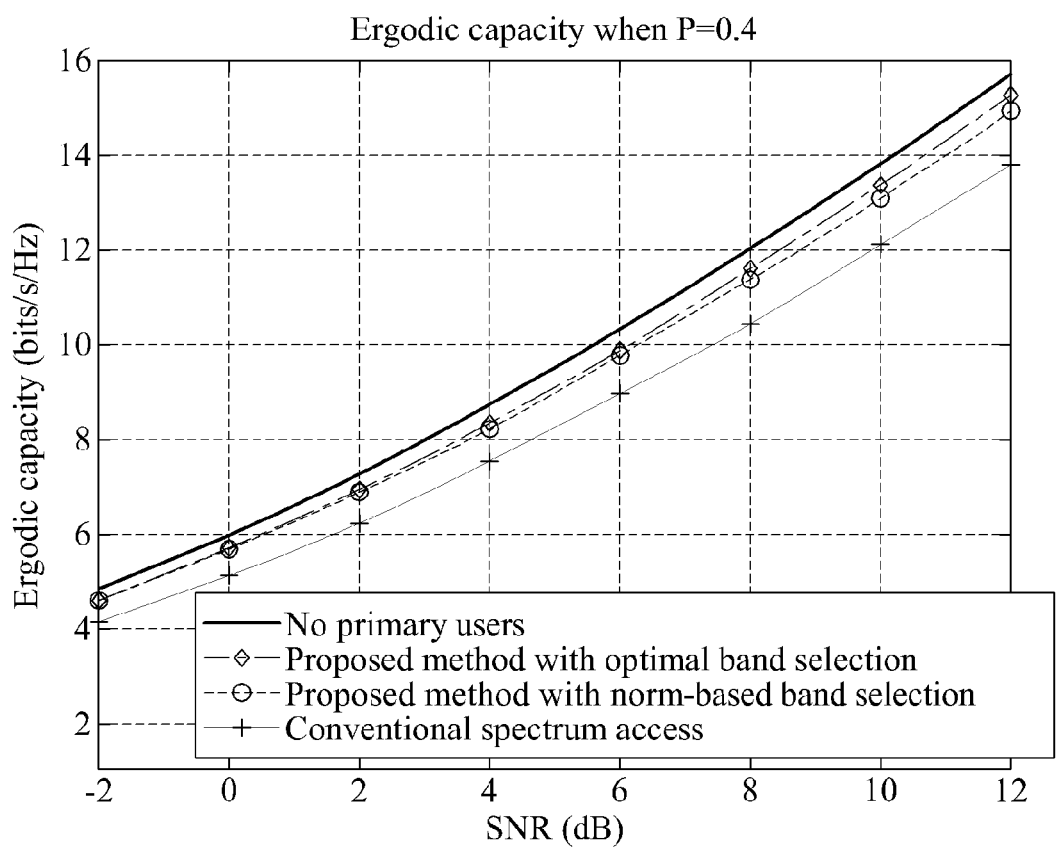
FIG. 12 is a graph showing comparison of a channel capacity when a probability that a spectrum band is vacant in a secondary transmitter included in a MIMO cognitive radio communication system according to an embodiment of the present invention is 0.4.
Figure 13:
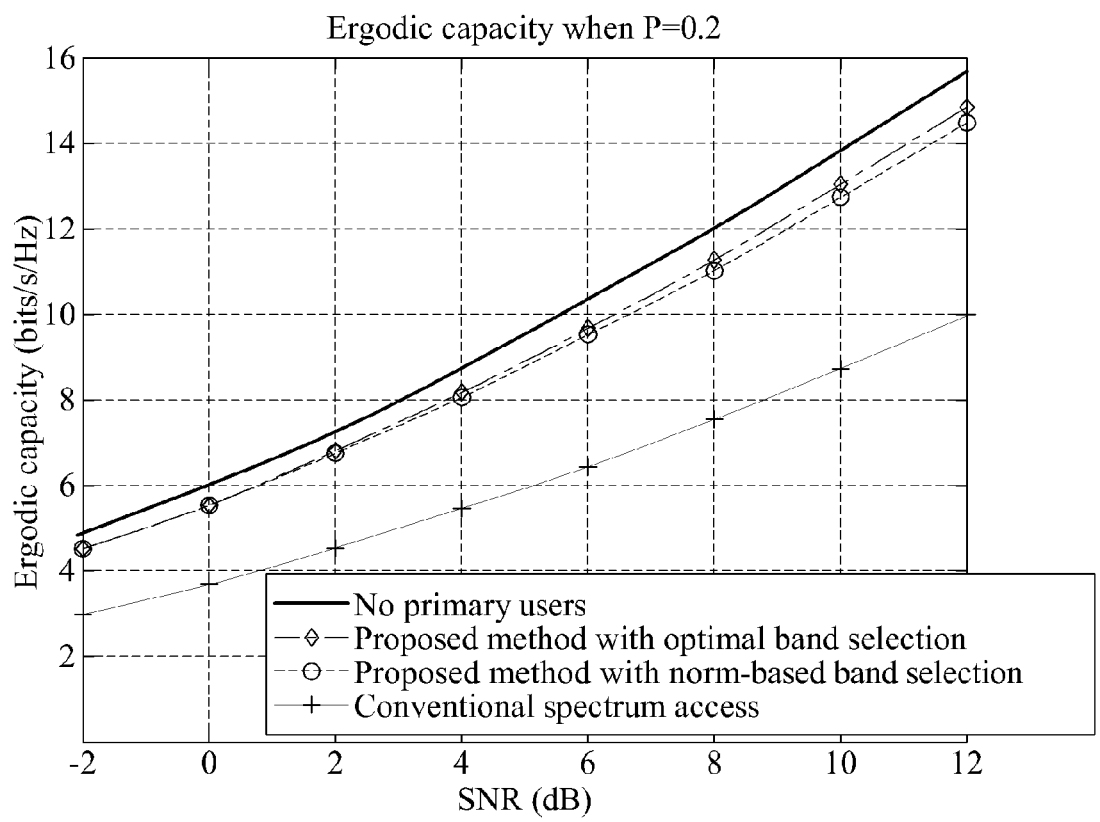
FIG. 13 is a graph showing comparison of a channel capacity when a probability that a spectrum band is vacant in a secondary transmitter included in a MIMO cognitive radio communication system according to an embodiment of the present invention is 0.2.

FIG. 12 is a graph showing comparison of a channel capacity when a probability P that a spectrum band is vacant in a secondary transmitter included in a MIMO cognitive radio communication system according to an embodiment of the present invention is 0.4, and FIG. 13 is a graph showing comparison of a channel capacity when a probability P that a spectrum band is vacant in a secondary transmitter included in a MIMO cognitive radio communication system according to an embodiment of the present invention is 0.2.

Referring to FIG. 12 and FIG. 13, it may be assumed that a total number of five spectrum bands are present, that is, K=5 in the MIMO cognitive radio communication system, the number of antennas installed in the secondary transmitter is $N_t=4$, and the number of antennas installed in the secondary receiver is $N_r=3$. Also, it is assumed that a probability that a spectrum band may be vacant with respect to all of the spectrum bands k is $P_k=P$.

FIG. 12 shows a channel capacity in the MIMO radio cognitive communication system when P=0.4.

In FIG. 12 and FIG. 13, "proposed method with optimal band selection" may be a result obtained by calculating the channel capacity with respect to all of the spectrum bands k according to Equation 4 and then jointly calculating the spectrum band index $\hat{k}$ and a covariance $R_s=E[s(k)s^H(k)]$ of a transmission signal.

Also, "proposed method with norm-based band selection" may be a result obtained by initially determining the spectrum band index $\hat{k}$ according to Equation 6 and then designing the covariance $R_s=E[s(k)s^H(k)]$ of the transmission signal maximizing the channel capacity only in the spectrum band index $\hat{k}$.

For comparison, the graph of FIG. 12 also shows a channel capacity in the general cognitive radio communication (see FIG. 1) and a channel capacity when the primary user is absent.

Referring to FIG. 12, when the primary user is absent, the channel capacity may be highest and it can be verified that communication methods according to embodiments of the present invention show a relatively high channel capacity compared to the general communication method.

Also, it can be verified that a degradation in the performance of the low complexity band selection method according to Equation 6 is insignificant compared to the optimal band selection method of Equation 4.

FIG. 13 shows a channel capacity when P=0.2 and shows a tendency similar to FIG. 12. However, it can be verified that the communication methods according to embodiments of the present invention showed a relatively great performance enhancement compared to the general method. That is, in an environment where the probability that the spectrum band is vacant, for example, in inner city areas, the communication method of the secondary transmitter according to an embodiment of the present invention may be further advantageous than the general method.

Figure 14A:
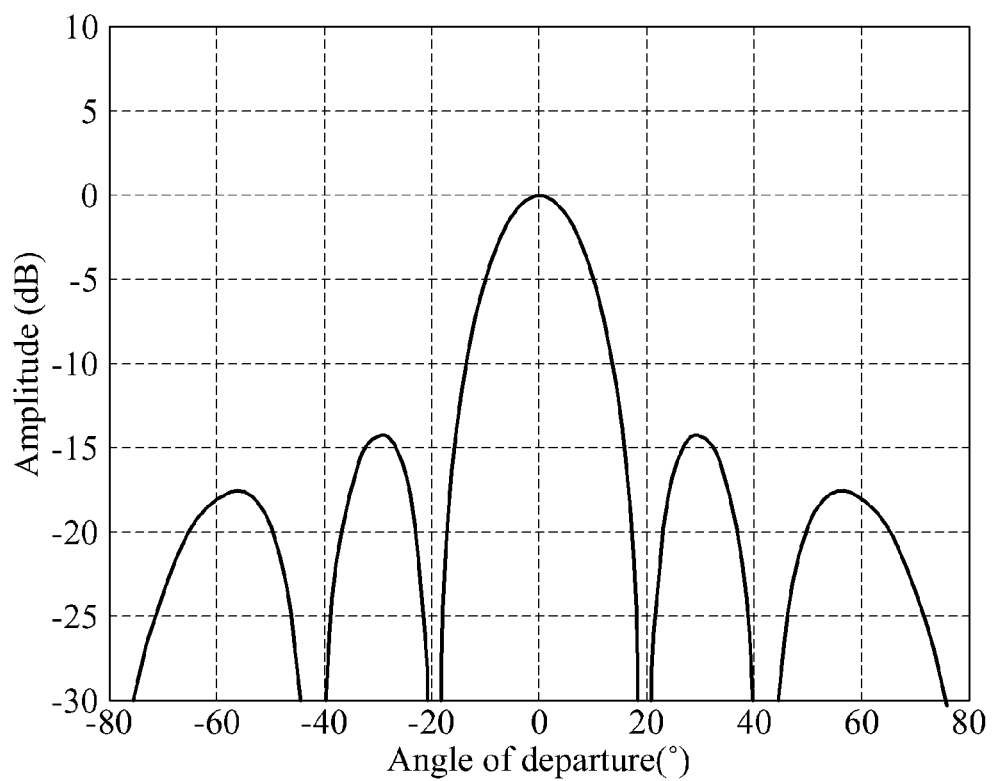
FIGS. 14A and 14B are graphs showing beam patterns before and after performing preprocessing according to an embodiment of the present invention.
Figure 14B:
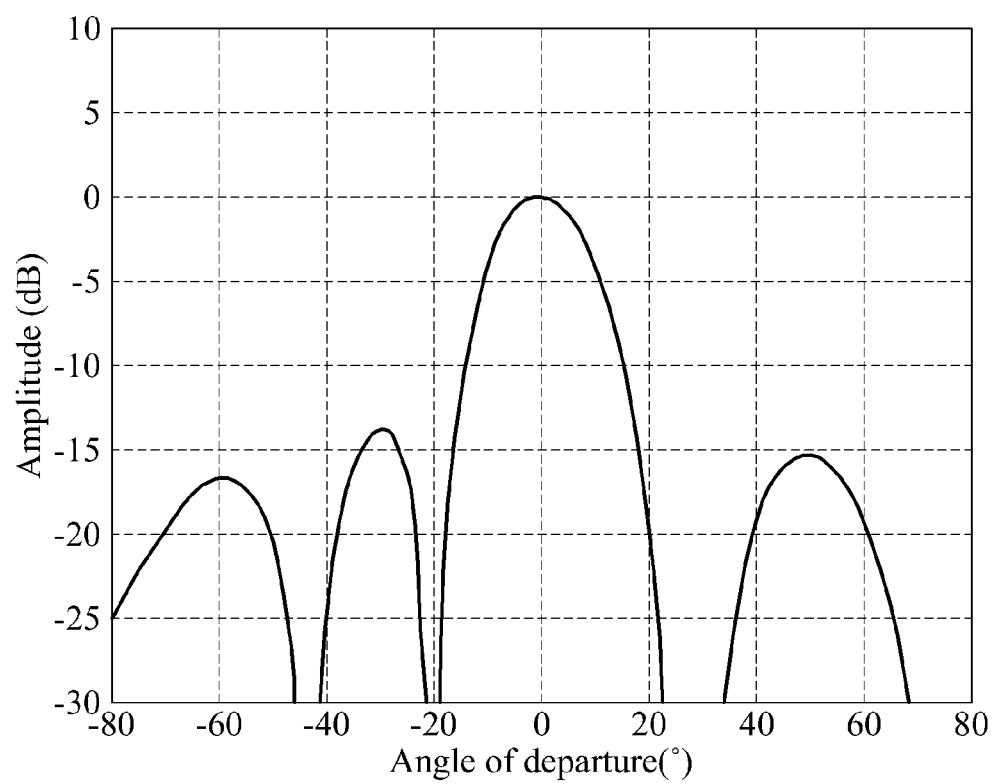

FIGS. 14A and 14B are graphs showing beam patterns before and after performing preprocessing according to an embodiment of the present invention. FIG. 14A shows a beam pattern before performing preprocessing when the secondary transmitter uses a linear array antenna of $N_t=6$, and FIG. 14B shows a beam pattern after performing preprocessing.

Here, when an AOA of a primary user is assumed as 30 degrees, it can be seen from FIG. 14B that a null has occurred in 30 degrees of the primary user after the preprocessing process is performed.

Figure 15:
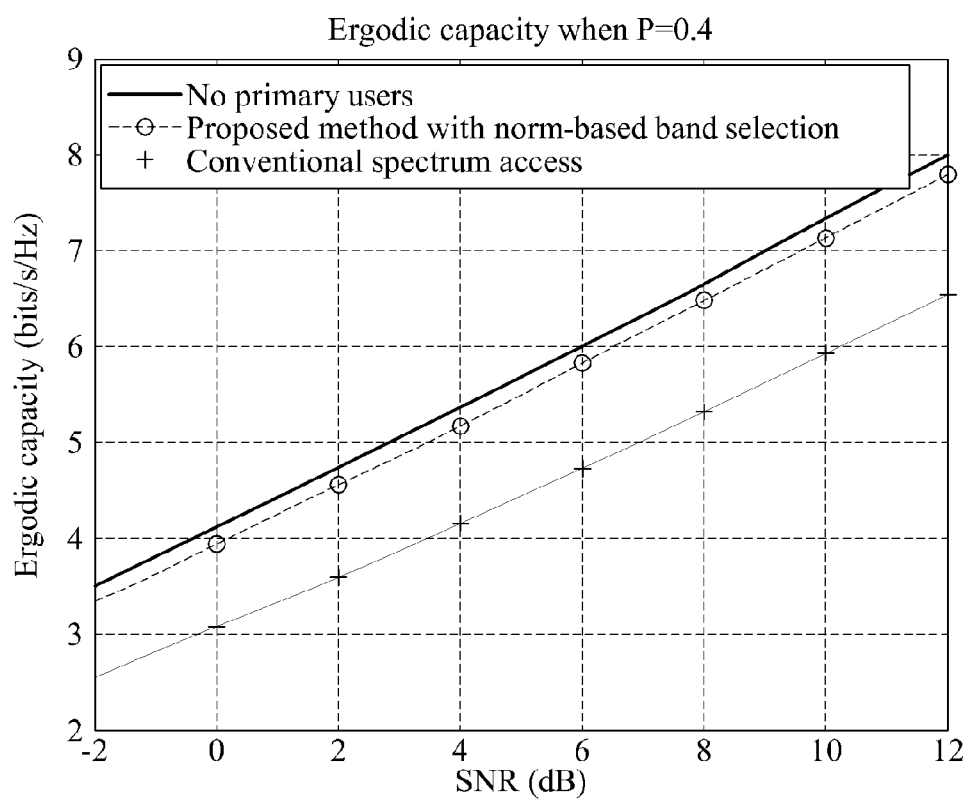
FIG. 15 is a graph showing comparison of a channel capacity when a probability that a spectrum band is vacant in a secondary transmitter included in a cognitive radio communication system using a linear array antenna according to an embodiment of the present invention is 0.4.

FIG. 15 is a graph showing comparison of a channel capacity when a probability P that a spectrum band is vacant in a secondary transmitter included in a cognitive radio communication system using a linear array antenna according to an embodiment of the present invention is 0.4.

Similar to FIG. 12 and FIG. 13, it can be seen that the channel capacity in the secondary transmitter included in the cognitive radio communication system using the linear array antenna according to an embodiment of the present invention is higher than a channel capacity of a general cognitive radio communication system.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A communication method of a secondary transmitter included in a multiple-antenna based multiple input multiple output (MIMO) cognitive radio communication system, the method comprising:
    estimating an interference channel between the secondary transmitter and a primary user in each of at least one first spectrum band that is being used in a primary system;
    calculating an orthogonal projection matrix to cancel interference with respect to the primary user from the interference channel;
    calculating an effective channel between the secondary transmitter and a secondary receiver based on the orthogonal projection matrix configured to cancel interference with respect to the primary user from the interference channel; and
    selecting an index of an optimal spectrum band from the at least one first spectrum band based on the orthogonal projection matrix and the effective channel.

2. The method of claim 1, wherein the selecting comprises selecting the index of the optimal spectrum band from the at least one first spectrum band based on the orthogonal projection matrix and the effective channel, to maximize a channel capacity of the secondary transmitter.

3. The method of claim 1, wherein:
    the selecting comprises selecting the index of the optimal spectrum band from the at least one first spectrum band to maximize a channel gain of the effective channel, and
    the method further comprises:
    adjusting a covariance of a transmission signal to maximize a channel capacity of the secondary transmitter in an index of the selected optimal spectrum band.

4. The method of claim 1, further comprising:
    replacing the orthogonal projection matrix with an identity matrix corresponding to the number of antennas installed in the primary user, with respect to a second spectrum band that is not being used by the primary user,
    wherein the selecting comprises selecting the index of the optimal spectrum band from the at least one first spectrum band based on the identity matrix and the effective channel.

5. The method of claim 1, further comprising:
    sequentially storing indices of spectrum bands in a backup channel list in an order starting from the index of the optimal spectrum band maximizing a channel gain of the effective channel.

6. The method of claim 1, further comprising:
    sensing available spectrum bands regardless of whether the primary user uses each of the at least one first spectrum band.

7. The method of claim 6, further comprising:
    determining whether there is at least one second spectrum band not used by the primary user among the available spectrum bands; and
    setting, as the index of the optimal spectrum band, an index of a second spectrum band maximizing a channel gain of the effective channel from the at least one second spectrum band, when there is the at least one second spectrum band not used by the primary user.

8. A communication method of a secondary transmitter included in a beamforming-based multiple input multiple output (MIMO) cognitive radio communication system using a linear array antenna, the method comprising:
    estimating an angle of arrival between the secondary transmitter and a primary user in each of at least one first spectrum band that is being used by a primary system;
    calculating an orthogonal projection matrix to cancel interference with respect to the primary user from an array response matrix based on the angle of arrival;
    calculating an effective channel between the secondary transmitter and a secondary receiver based on the orthogonal projection matrix configured to cancel interference with respect to the primary user from the array response matrix based on the angle of arrival; and selecting an index of an optimal spectrum band from the at least one first spectrum band based on the orthogonal projection matrix and the effective channel.

9. The method of claim 8, wherein the selecting comprises selecting the index of the optimal spectrum band from the at least one first spectrum band based on the orthogonal projection matrix and the effective channel, to maximize a channel capacity of the secondary transmitter.

10. The method of claim 8, wherein:
the selecting comprises selecting the index of the optimal spectrum band from the at least one first spectrum band to maximize a channel gain of the effective channel, and the method further comprises:
adjusting a covariance of a transmission signal to maximize a channel capacity of the secondary transmitter in an index of the selected optimal spectrum band.

11. The method of claim 8, further comprising:
replacing the orthogonal projection matrix with an orthogonal projection matrix that is nulled toward the primary user, with respect to a second spectrum band that is not being used by the primary user,
wherein the selecting comprises selecting the index of the optimal spectrum band from the at least one first spectrum band based on the orthogonal projection matrix that is nulled toward the primary user and the effective channel.

12. The method of claim 8, further comprising:
sequentially storing indices of spectrum bands in a backup channel list in an order starting from the index of the optimal spectrum band maximizing a channel gain of the effective channel.

13. The method of claim 8, wherein the estimating comprises estimating an angle of arrival of a signal that comes from a spectrum band of the primary user into the secondary transmitter, or an angle of arrival of a signal that is transmitted via multiple paths and comes into the secondary transmitter.

14. The method of claim 13, wherein the estimating comprises estimating the angle of arrival using geographical location or a phase difference between antennas, included in the linear antenna array, and an antenna gain, which are stored in a database.

15. The method of claim 8, further comprising:
sensing available spectrum bands regardless of whether the primary user uses each of the at least one first spectrum band.

16. The method of claim 15, further comprising:
determining whether there is at least one second spectrum band not used by the primary user among the available spectrum bands; and
setting, as the index of the optimal spectrum band, an index of a second spectrum band maximizing a channel gain of the effective channel from the at least one second spectrum band, when there is the at least one second spectrum band not used by the primary user.

17. A secondary transmitter included in a multiple-antenna based multiple input multiple output (MIMO) cognitive radio communication system, the secondary transmitter comprising:
an interference channel estimator to estimate an interference channel between the secondary transmitter and a primary user in each of at least one first spectrum band that is being used in a primary system;
a calculator to calculate an orthogonal projection matrix to cancel interference with respect to the primary user from the interference channel, and to calculate an effective channel between the secondary transmitter and a secondary receiver based on the orthogonal projection matrix configured to cancel interference with respect to the primary user from the interference channel; and
a selector to select an index of an optimal spectrum band from the at least one first spectrum band based on the orthogonal projection matrix and the effective channel.

18. A secondary transmitter included in a beamforming-based multiple input multiple output (MIMO) cognitive radio communication system using a linear array antenna, the secondary transmitter comprising:
an angle of arrival estimator to estimate an angle of arrival between the secondary transmitter and a primary user in each of at least one first spectrum band that is being used by a primary system;
a calculator to calculate an orthogonal projection matrix to cancel interference with respect to the primary user from an array response matrix based on the angle of arrival, and to calculate an effective channel between the secondary transmitter and a secondary receiver based on the orthogonal projection matrix configured to cancel interference with respect to the primary user from the array response matrix based on the angle of arrival; and
a selector to select an index of an optimal spectrum band from the at least one first spectrum band based on the orthogonal projection matrix and the effective channel.

* * * * *